US007921180B2

(12) United States Patent　　(10) Patent No.: US 7,921,180 B2
Greer et al.　　(45) Date of Patent: Apr. 5, 2011

(54) METHOD AND APPARATUS FOR ACCESSING PRODUCT INFORMATION USING RF TAG DATA

(75) Inventors: Patrick Thomas Greer, Kirkland, WA (US); Christopher A. Wiklof, Everett, WA (US)

(73) Assignee: Intermec IP Corp., Everett, WA (US)

( * ) Notice: Subject to any disclaimer, the term of this patent is extended or adjusted under 35 U.S.C. 154(b) by 2416 days.

(21) Appl. No.: 09/788,628

(22) Filed: Feb. 14, 2001

(65) Prior Publication Data

US 2002/0165931 A1 Nov. 7, 2002

Related U.S. Application Data

(60) Provisional application No. 60/183,421, filed on Feb. 18, 2000.

(51) Int. Cl.
*G06F 15/16* (2006.01)
(52) U.S. Cl. ......... 709/217; 235/380; 370/313; 713/168
(58) Field of Classification Search ................... 709/217, 709/229; 235/472.03, 380; 370/313; 713/168
See application file for complete search history.

(56) References Cited

U.S. PATENT DOCUMENTS

| 5,493,107 | A |   | 2/1996  | Gupta et al.             |
|-----------|---|---|---------|--------------------------|
| 5,629,981 | A | * | 5/1997  | Nerlikar ........... 713/168 |
| 5,804,803 | A | * | 9/1998  | Cragun et al. ...... 235/375 |
| 5,978,772 | A |   | 11/1999 | Mold                     |
| 6,012,102 | A |   | 1/2000  | Shachar                  |
| 6,045,048 | A |   | 4/2000  | Wilz, Sr. et al.         |
| 6,189,789 | B1|   | 2/2001  | Levine et al.            |
| 6,331,972 | B1| * | 12/2001 | Harris et al. ...... 370/313 |
| 6,367,694 | B1|   | 4/2002  | Roslak                   |
| 6,446,871 | B1| * | 9/2002  | Buckley et al. ... 235/472.03 |
| 6,488,205 | B1| * | 12/2002 | Jacobson ........ 235/380 |
| 6,669,087 | B2|   | 12/2003 | Wiklof et al.            |
| 6,745,234 | B1| * | 6/2004  | Philyaw et al. ..... 709/217 |

\* cited by examiner

*Primary Examiner* — Tammy T Nguyen
(74) *Attorney, Agent, or Firm* — Seed IP Law Group PLLC

(57) ABSTRACT

A method and apparatus for convenient and easy access to product- and shipment-related information and/or transactions is disclosed. A radio frequency tag reader is used to read a radio frequency tag having a structured data format. The end device parses one or more particular data entities from the data read. The radio frequency tag reader accesses a URL having at least a portion in common with one or more of the parsed data entities and displays associated web page content or processes an associated transaction. The radio frequency tag reader may sequentially substitute a series of most probable non-common URL portions to locate associated content if the first tried URL does not result in a valid response. Alternatively, a server may provide such search functionality.

27 Claims, 7 Drawing Sheets

METHOD AND APPARATUS FOR ACCESSING PRODUCT INFORMATION USING RF TAG DATA

CROSS REFERENCES TO RELATED APPLICATIONS

The present patent application claims benefit from the U.S. provisional patent application entitled METHOD AND APPARATUS FOR ACCESSING PRODUCT INFORMATION USING BAR CODE DATA, Ser. No. 60/183,421, dated Feb. 18, 2000 and is related to U.S. Pat. No. 6,669,087, entitled METHOD AND APPARATUS FOR ACCESSING PRODUCT INFORMATION USING BAR CODE DATA, invented by Wiklof, et al., herewith.

TECHNICAL FIELD

The present invention is directed to the field of radio frequency identification data collection and more particularly to the field of accessing information pertaining to a radio frequency tagged object via a computer network such as the Internet.

BACKGROUND OF THE INVENTION

The efficient distribution of product-related information to end-users and potential end-users is an important tool for minimizing sales cycle times, improving user satisfaction, reducing warranty costs, and minimizing manufacturer liability. The presentation of desired and regulated information often occupies a great deal of product label space and is often limiting to the industrial and aesthetic design of product packaging.

Explosive growth of the Internet and World Wide Web has provided an efficient means for the distribution of information, and product-related information in particular. To date, accessing product information has required a user to determine the manufacturer of the product, determine the manufacturer's URL, enter the URL into a web browser, and search the manufacturer's web site to find relevant product information.

The present invention makes use of a product's UPC or other symbol to access data about the product.

The symbology-related background of the invention is described in *The Bar Code Book* by Roger C. Palmer, hereby incorporated by reference.

In the field of automated data collection and, more particularly, optical data encodation, bar code symbologies have achieved wide use and have proved themselves to be very reliable and cost effective. Conventional linear bar code symbologies encode data as a series of variable width bars separated by variable width spaces. Generally, bars are formed from dark ink on a light colored background that forms the spaces.

One particularly successful and widespread family of bar code symbologies is the UPC/EAN/JAN family. This group of bar code symbologies is used to identify virtually every type of pre-packaged retail item sold in the U.S. and Canada, Europe, and Japan, respectively.

The Universal Product Code (UPC), European Article Numbering (EAN), and Japanese Article Numbering (JAN) systems are administered by the Uniform Code Council (UCC) and its foreign affiliates. Manufacturers who are members of the UCC may be assigned one or more 5-digit Company Prefixes, or company identifiers, that are used to identify the manufacturer in the context of the UPC system. Manufacturers, in turn, are free to assign a 5-digit product identifier code to each of their retail products. By using the combination of a company prefix with a product identifier code, it is thus possible to identify each product manufactured by UCC member companies. EAN and JAN systems are administered similarly.

To automate the retail check-out process, company prefixes and product identifiers are combined and encoded in UPC (also EAN and JAN) bar code symbols that are affixed to products. For an item to be checked out, a checker or customer scans a UPC/EAN/JAN symbol. A look-up in the store's computer compares the scanned symbol to a list of products and determines the associated price. For the system to work properly, the store must maintain an up-to-date database that includes at least the UPC number and price for each item carried. Usually an alphanumeric description of the item is also associated with the UPC number.

The UPC symbology is a fixed-length numeric continuous symbology comprising characters having two bars and two spaces distributed within 7 modules. Each bar and space is between one and four modules wide. In the UPC-A variant, the symbol is divided into two halves separated by two center guard bars and bounded both left and right by a pair of outer guard bars. The left half of the UPC-A symbol comprises a 5-digit company prefix directly encoded (for number system characters 0, 6, and 7) and a number system character encoded by the parity pattern of the left characters. The right half of the UPC-A symbol comprises a 5-digit product identifier directly encoded and a Mod 10 check digit for the first 11 symbol characters. More recently, new number system digits 18, and 9 have been allocated for assignment, with number system 8 being used for 8-digit (7 digits plus 1-digit number system) company prefixes. Each half of the UPC-A symbol may be independently decoded.

Other versions of the UPC/EAN/JAN symbology are used for reduced space applications (for instance, UPC version E) and for applications requiring additional data as in the 2- and 4-digit book addenda.

Another symbology standard, UCC-128 (and the equivalent EAN-128) is based on the Code 128 symbology but includes a data structure well-adapted to tracking shipments within a supply chain. The UCC-128 symbology is similar to the UPC symbology in that it includes provision for encoding a company prefix and a company-assigned code. In the case of UCC-128, the company-assigned code is a shipment serial number that can be used to identify uniquely the contents of a particular shipment from that company.

More recently, the UCC and EAN International have been investigating alternative data storage media for associating a UCC/EAN structured data set to an item. One example is the use of magnetically- or electrically-encoded data that may be accessed by a non-line-of-sight interrogator such as an RFID interrogator. Another example of such innovation includes the RSS and composite symbologies that use a combination of linear and 2D symbols to encode more data in less space. Bar code symbols, RF tags, 2D symbols, composite symbols, laser cards, touch memory, and other similar objects are known collectively as portable data carriers.

SUMMARY OF THE INVENTION

The present invention teaches a method and apparatus for providing rapid and convenient Internet access to information about a product and/or transactions involving a product using data encoded thereon. In one embodiment, the product's UPC/EAN/JAN symbol is used to locate the information or initiate the transaction.

One aspect of the present invention relates a business method involving registering at least a portion of a product's UPC/EAN/JAN code as a URL for accessing information about the product.

Another aspect of the present invention relates to a method of scanning a symbol, parsing data from the symbol, appending additional data to form a URL, opening a browser, directing the browser to the URL, and displaying information relevant to the symbol.

Another aspect of the present invention relates to a device for scanning a product symbol, accessing a URL corresponding to the product symbol, and displaying data relative to the product.

Another aspect of the present invention relates to a business method involving the formation of a web site that provides links to manufacturers of products using at least a portion of product UPC/EAN/JAN symbols to determine the links.

Another aspect of the present invention relates to a business method involving a web application that stores product data, receives a query from an end device, and transmits product data to the end device according to UPC/EAN/JAN data contained within the query.

Another aspect of the invention relates to a method and apparatus for performing a search for information about or a transaction concerning an object using data encoded on a portable data carrier associated with the object, and one or more structural formats likely to produce a URL where the data or transaction resides.

DETAILED DESCRIPTION OF THE INVENTION

The present invention contemplates a method and apparatus for rapid access to product and company information via an Internet connection. A UPC, EAN, or JAN symbol is scanned or alternatively entered by hand. Alternatively, another type of portable data carrier such as RF tag, touch memory, magnetic stripe, or laser card for instance is queried for data. An Internet URL corresponding to symbol data is contacted and data therefrom displayed on an end device. The invention includes end devices and computer software for carrying out the invention as well as a method of doing business.

In the past, the only product information available to an end-user at the point of sale was that which was physically printed on a product label. Sales were delayed or lost when a user desired additional information but had to seek that information elsewhere.

The present invention brings complete product information to a user at the point of sale using the existing product code infrastructure to address said information. This solution avoids needing to print additional information on the label, avoids needing to create an essentially duplicate data index to address additional information, but does result in relevant information being delivered to the potential purchaser or subsequent user.

An end device scans the UPC (or alternatively, the EAN or JAN) symbol on a product. Scanned data is appended to appropriate prefix and suffix data and is used to address a web site displaying product information. For example, for a product carrying the UPC symbol encoding the data "0 43100 06622 4", a character sequence for prepending comprising the characters "http://www." and a character sequence for appending comprising the domain ".com" would be appended to form a URL reading "http://www.043100066224.com". This address would be used by a browser to access data about the corresponding product, for instance, "The Mead Corporation, Dayton, Ohio 45463 U.S.A. Made In USA. 100 sheet college ruled 1 subject notebook. College ruled 11×8½ in (27.9×21.5 cm). Available in several colors, powder blue, royal blue, crimson, insignia yellow, and fir green. See also product number 06623, our equivalent wide ruled 1 subject notebook. See your local retailer, contact us at (000) 555-1234, or press the 'order' button to purchase. Mead manufactures a wide range of paper products for all your needs. Press 'home' to access a complete catalog."

An alternative embodiment accesses a pre-determined URL which in turn, passes a second URL back to the end device to access product data.

A second alternative embodiment sequentially attempts connection with several possible URLs having data on the product at hand, including domains such as .com, .net, .gov, .org, etc.

Figure 1:
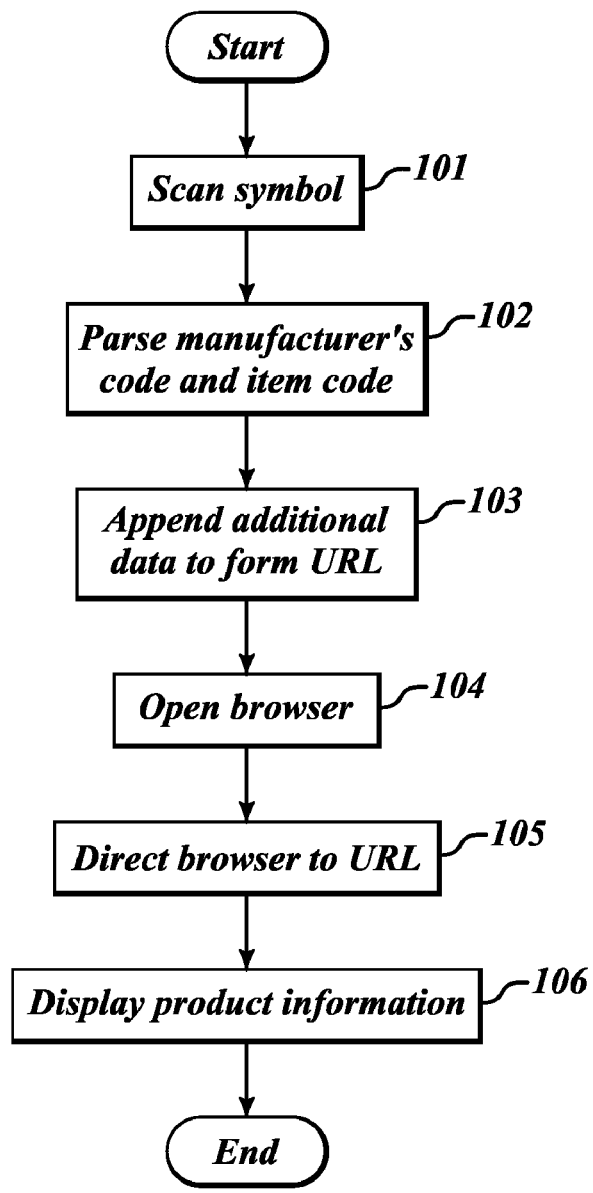
FIG. 1 shows a method for an end device to scan a symbol, form a URL containing data from the symbol, access a web site corresponding to the URL with a browser, and display data transmitted from the web site.

FIG. 1 illustrates a method for scanning a symbol to access data associated with the symbol. In step 101, the symbol is scanned. This may be via a fixed scanner, a hand-held discrete scanner connected to a reader, or an integrated end device. Step 102 indicates the parsing of relevant data from the symbol. A first set of data, the manufacturers code, is extracted from the left side of the symbol. A second set of data, the product code, is extracted from the right side of the symbol. An optional piece of data, the number system, may also be extracted to determine additional information such as the domain. In step 103, data is combined with manufacturer's and optionally product data to form a complete URL. In optional step 104, a browser is opened and in step 105, the browser is directed to the URL formed in step 103 using IP. Product information received from the URL, corresponding to the scanned symbol, is then displayed to the user in step 106.

Figure 2:
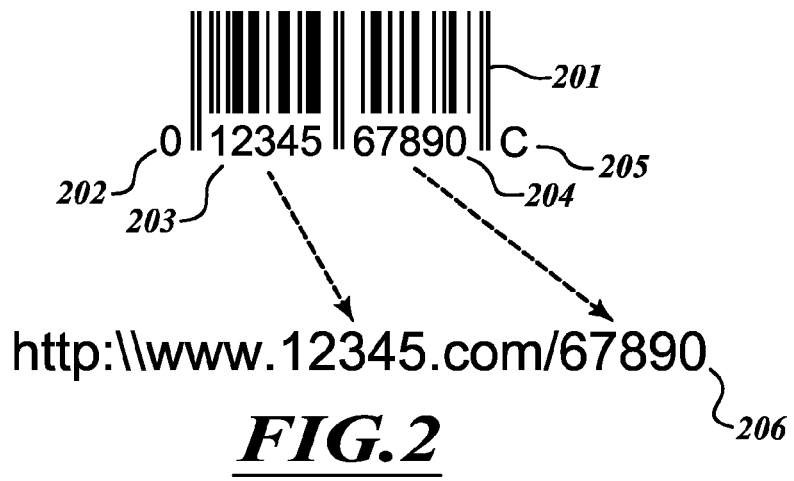
FIG. 2 shows a method for parsing symbol data to form a URL containing at least some of the symbol data.

FIG. 2 illustrates one exemplary method for parsing symbol data into a URL. A UPC, EAN, or JAN symbol 201 comprises four data components. A first data component 202 is known as the number system and indicates a region of origin or other types of symbols. The first data component is encoded in a parity pattern in the left half of the symbol. Codewords in the left half of the symbol directly encode a manufacturer's identification 203. The right half of the symbol directly encodes a product identification 204 associated with the manufacturer associated with the manufacturer's identification 203. A modulus 10 check character 205 is encoded as a parity pattern in the codewords of the right half of the symbol. In the example shown in FIG. 2, the fixed characters "http://www." form the first portion of the URL. The manufacturer's code "12345" is parsed to form the next portion of the URL. The characters ".com/" are then added to the end of the manufacturer's code as the domain. Other alternative domains may also be used. The product code "67890" then forms the last part of the URL. The entire URL 206 is thus assembled to form the data string "http://www.12345.com/67890". This address may then be used to access data about the product labeled with the symbol 201. The example shown in FIG. 2 illustrates a way to access data directly from the manufacturer when the manufacturer holds the URL associated with the manufacturer's code.

Figure 3:
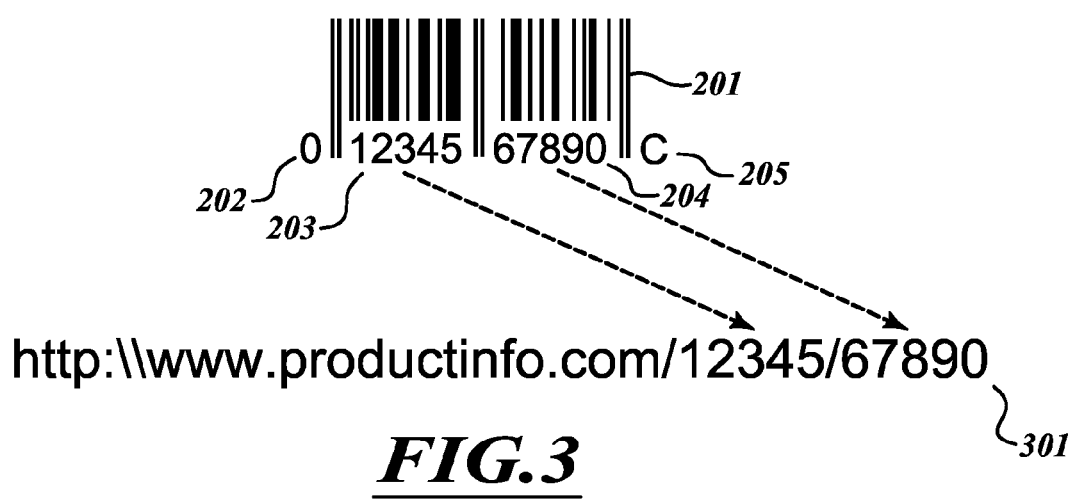
FIG. 3 shows another method for parsing symbol data to form a URL containing at least some of the symbol data.

FIG. 3 shows an alternative example of a way to construct a URL from a UPC/EAN/JAN symbol. This method shows a way to access product data through a third party web application. In this case, product information is appended below the domain. The alternative URL 301 "http://www.product-info.com/12345/67890" may access product information via a web site called "productinfo.com".

Figure 4:
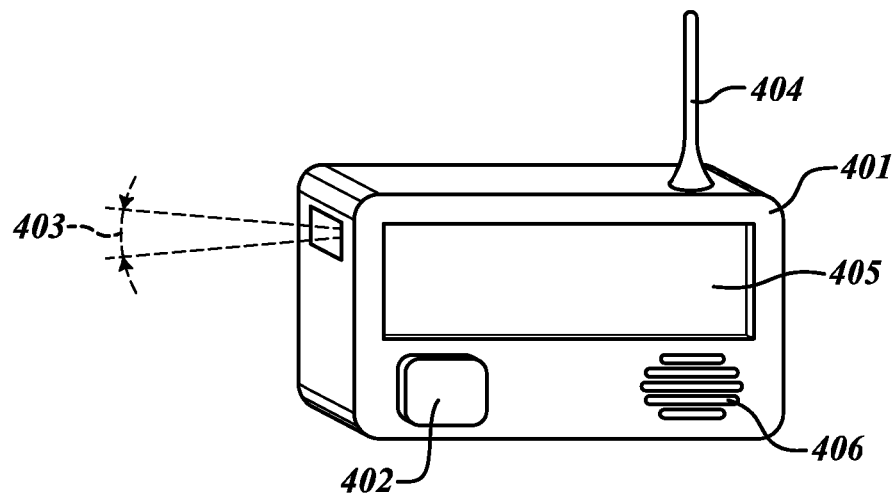
FIG. 4 shows a wireless apparatus for scanning a symbol, parsing symbol data to form a URL containing at least some of the symbol data, accessing a web site using the wireless link, and displaying data corresponding to the symbol.

FIG. 4 shows a wireless end device for accessing product information. A body 401 has a scan button 402 that is used to enable a scanner 403. Scanner 403 uses any of several scanning technologies known to the art including moving beam laser, CCD or CMD imager, or fixed spot wand. Upon scanning a symbol, a microcomputer in the end device; comprising at least a microprocessor, memory, and I/O; performs preprocessing steps described elsewhere in this document. The device of FIG. 4 then accesses product information on a server via a wireless interface through an antenna 404 and presents the information to a user on a display 405 or audibly via a speaker 406.

Figure 5:
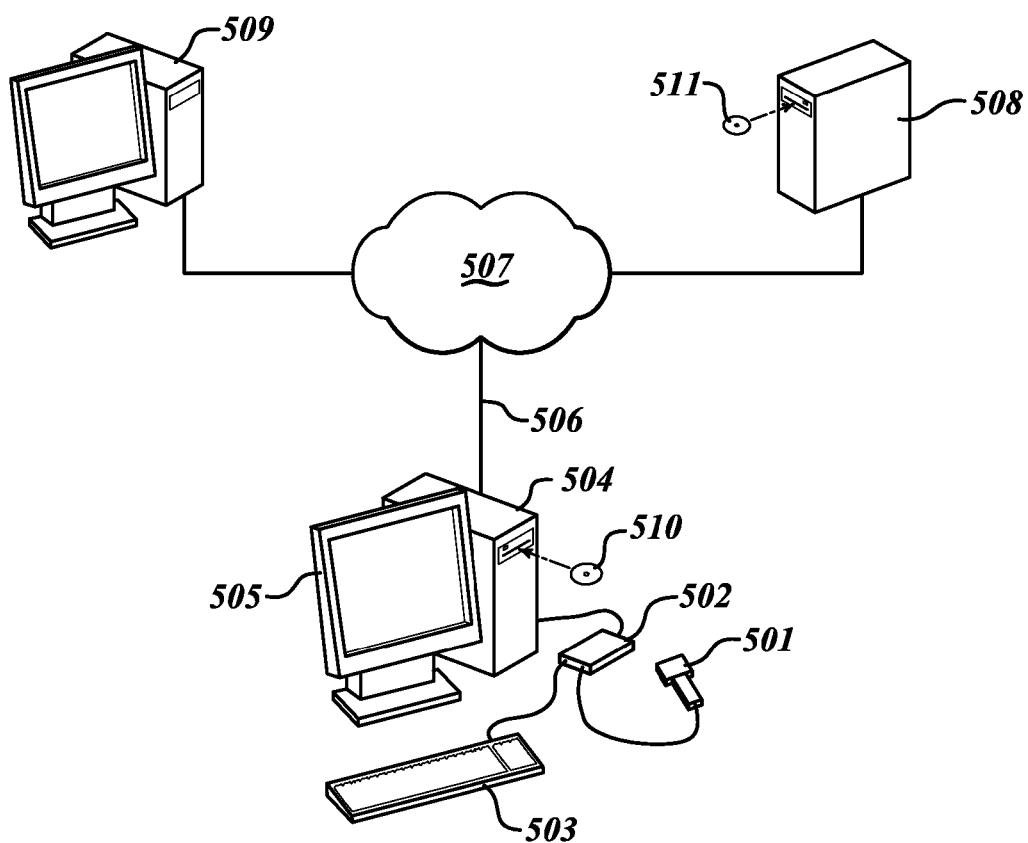
FIG. 5 shows a computer system for scanning a symbol and accessing product data corresponding to the symbol over the Internet.

FIG. 5 shows a computer having a scanner connected via the Internet to one or more servers holding information about products. A bar code scanner 501 is used to scan symbols and is connected to a wedge reader 502. The wedge reader 502 is connected between a keyboard 503 and a computer 504 such that data scanned by the scanner 501 appears to come from the keyboard 503. The wedge reader 502 may be programmed to do data parsing and data appending described elsewhere in this document. Alternatively, the scanner 501 may be connected to the computer 504 using an alternate port such as a serial port, a bi-directional parallel port, a firewire port, a SCSI port or other port. Data may be passed to an application via other means including writing the application to check the ports or via a virtual wedge. The computer 504 is connected to the Internet 507 via a wired or wireless interface 506. Interface 506 can include a conventional modem, a cable modem, a LAN, a digital subscriber line. a cellular modem, a satellite link, or other connection to the Internet. A first server 508 and, optionally, a second server 509 are connected to the Internet. Additional servers (not shown) are also available to ftp, http, and other access types by the computer 504 and each other. Portable media 510 and 511 may be used to load programs into a client computer 504 or server 508, respectively.

Figure 6:
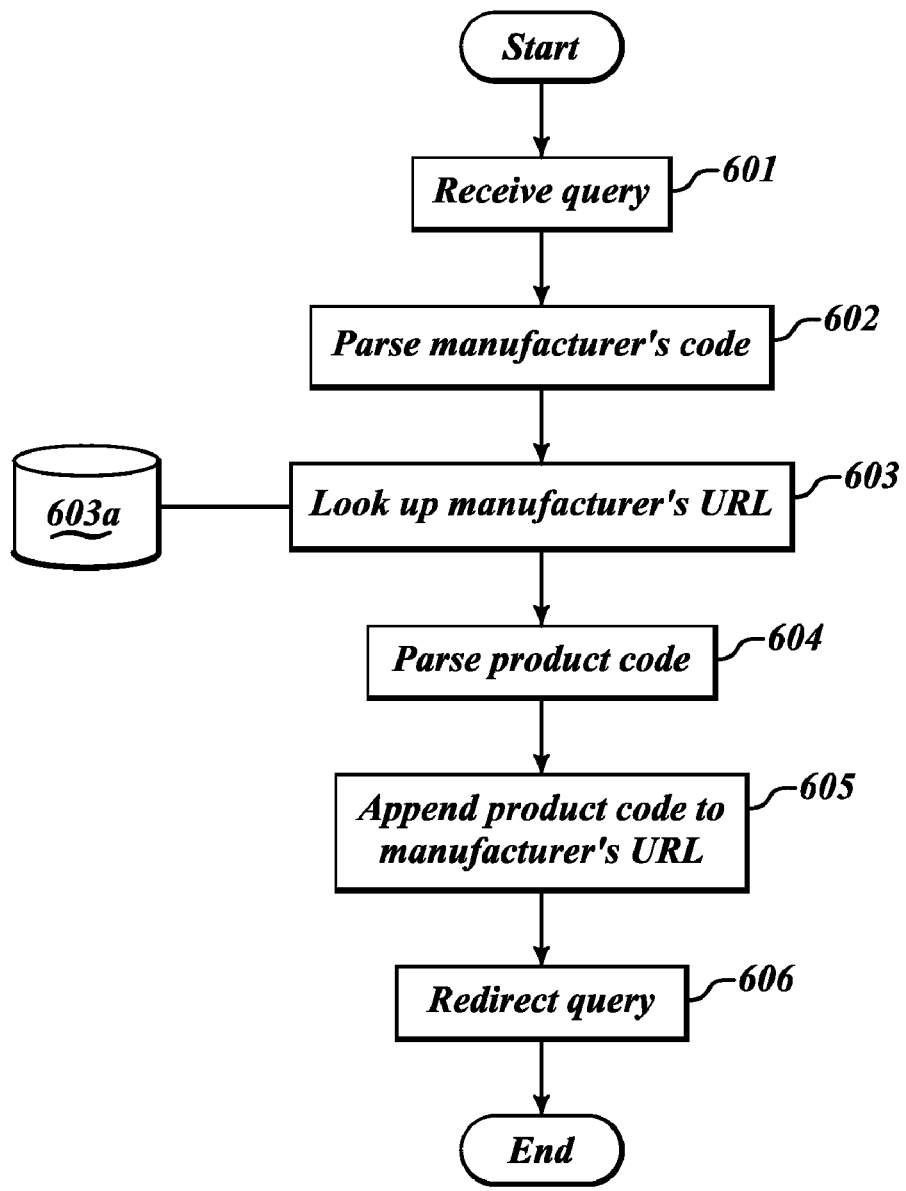
FIG. 6 shows a method for receiving a query containing data corresponding to a symbol on a server and redirecting the query to a second server having data corresponding to the symbol.

FIG. 6 shows a server-based method for directing a product information query to a manufacturer's web site for response. A query is received via means known to the art in step 601. The manufacturer's code is extracted from the received URL in 602 and the manufacturer's web address is looked up in a database 603a by step 603. The product code is parsed from the received URL in 604. In step 605, the manufacturer's web address and the product code are combined to form a new URL where relevant product data resides. In step 606, the user's query is hyperlinked to the URL determined in step 605 using known technology.

Figure 7:
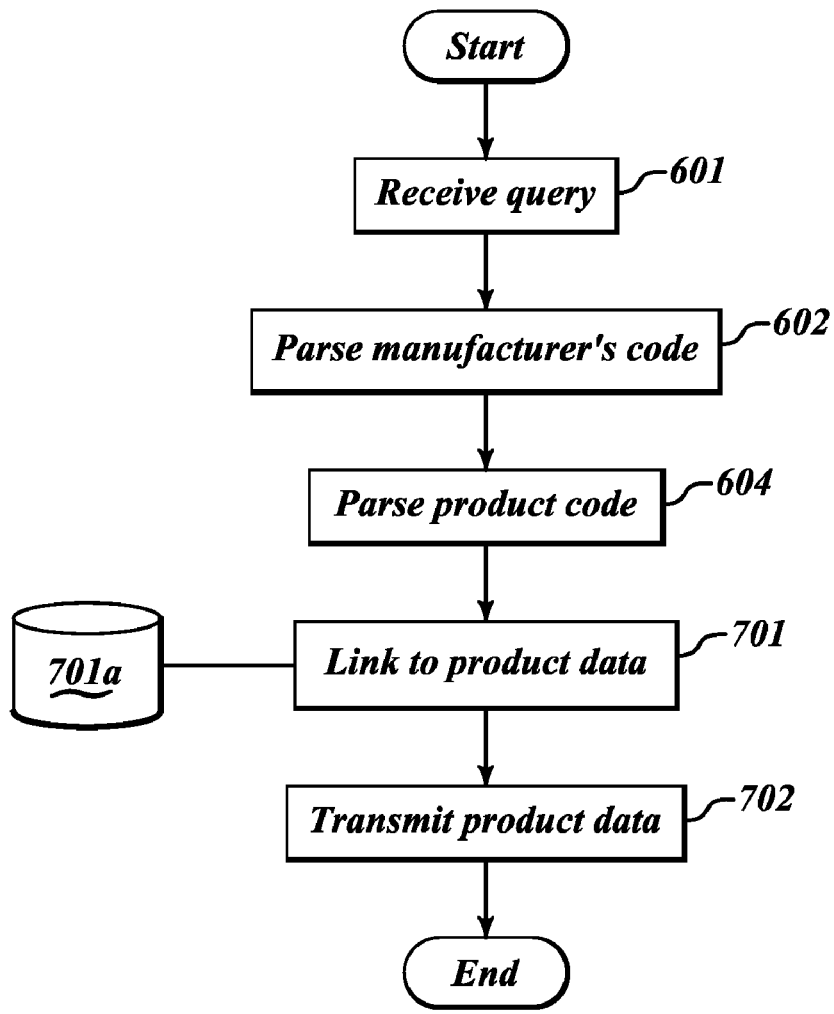
FIG. 7 shows a method for receiving a query containing data corresponding to a symbol on a server, looking up data corresponding to the symbol, and transmitting data corresponding to the symbol to the requesting device.

FIG. 7 shows a server-based method for responding to a query for product data. After the query is received in step 601, the manufacturers code and item code are parsed in steps 602 and 604, respectively. The query is then linked directly to product data residing on database 701a in step 701. The product data is then returned to the client in step 702.

Figure 8:
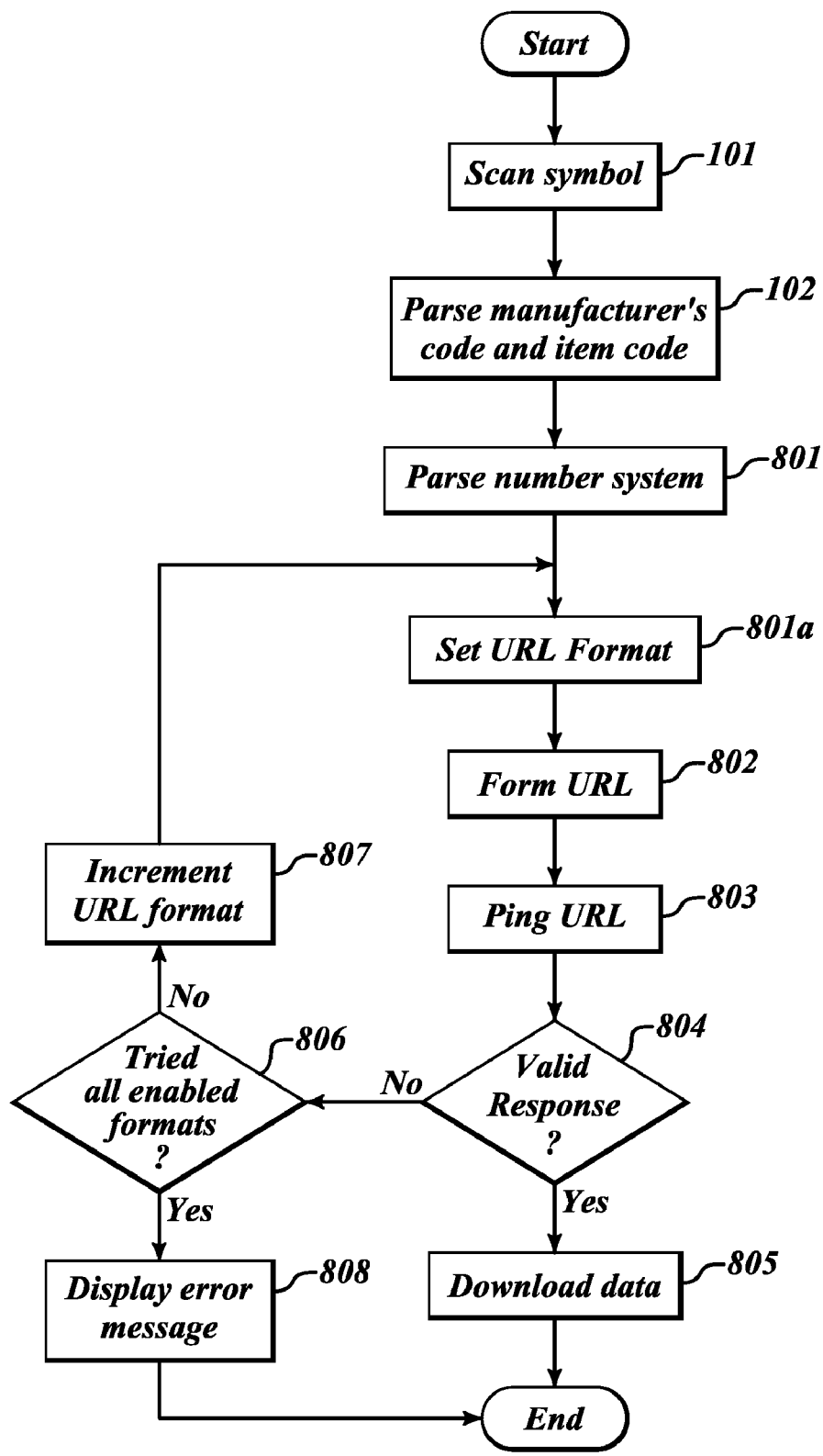
FIG. 8 shows a method for use in an end device that includes steps for trying a plurality of URLs for accessing product information.

FIG. 8 shows a client-based method for accessing product information. This method corresponds to the method shown in FIG. 1 but includes a method for searching several possible URLs for the data. After manufacturer and item codes are extracted in step 102, optional step 801 further extracts the number system value. In step 801a, a URL format is selected. This may be done using the number system and, optionally, the manufacturer code to select the most likely format. Different possible formats may be selected in order of highest probability or in simple list order. Examples of different forms include those using the manufacture code before the domain (for example www.12345.com/67890); using known database sites before the domain with the manufacturer, item code, and, optionally, number system following the domain (for example www.productinfo1.com/1234567890/0 or alternatively www.getdata.org/12345/67890); or using a different domain based upon number system (for instance www.swedishinfo.se/12345/67890) when the number system indicates the possibility of the manufacturer being Swedish). A URL to try is then formed using the selected format along with data from the instant symbol in step 802. The URL is accessed or pinged in step 803. A test is performed in step 804 to determine if the web site is valid and, optionally, if it contains relevant product information. The test in step 804 may include determining if the site responds, determining if the format of the site is consistent with product data, and/or determining if the content of the site is consistent with product data. Additionally, step 804 may include asking the user if the site contains the information sought. If the web site does contain valid data, then the data is downloaded and displayed on the end device in step 805. If the web site is not valid, then a test is made to determine if all known possibilities have been exhausted in step 806. If yes, then an error message is displayed to the user in step 808 indicating that the information sought could not be found. If there are remaining URL formats to be tried then a pointer is advanced to the next most likely or the next URL in a predetermined list in step 807 and the process of forming a URL and trying it repeated.

Figure 9:
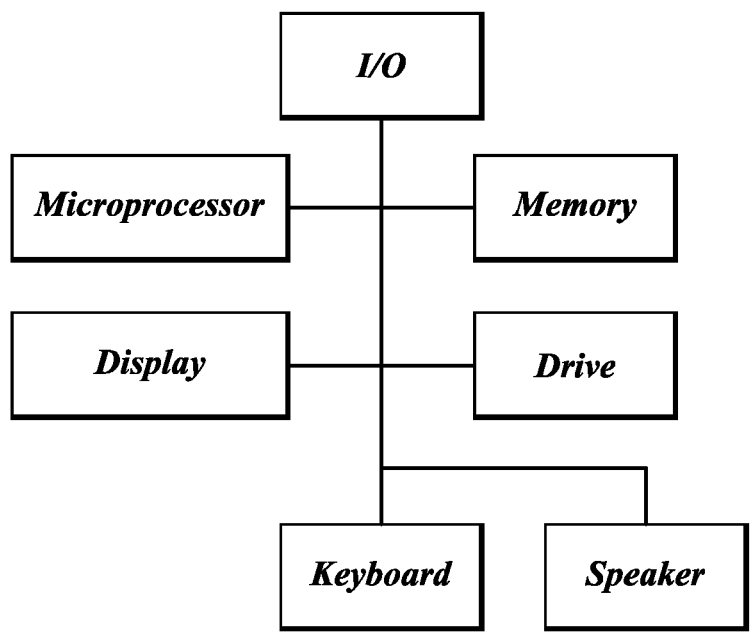
FIG. 9 shows a block diagram for a microcomputer-based end device such as those shown in FIG. 4 or 5.

FIG. 9 shows a block diagram for a microcomputer-based end device such as those shown in FIG. 4 or 5.

Figure 10:
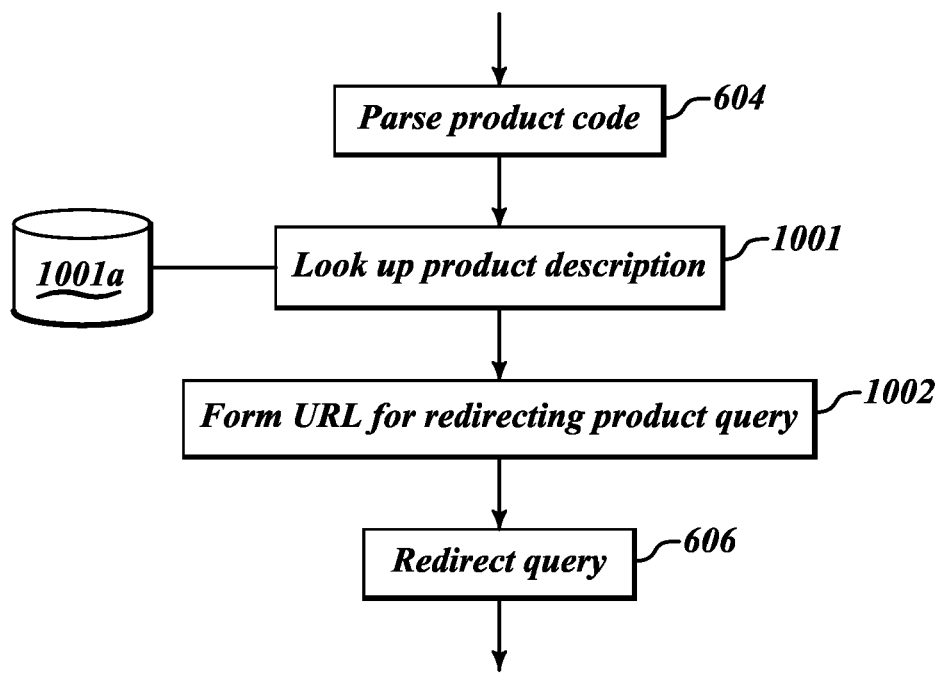
FIG. 10 shows optional steps to the process shown in FIG. 6.

FIG. 10 shows optional steps to the process shown in FIG. 6. In FIG. 10, the product or item code for a given manufacturer is compared to a database 1001a in step 1001 to determine possible synonyms. For instance, the manufacturer corresponding to manufacturer code 12345 may have a path on its web site to the product corresponding to 67890 that is not literally "/67890" Database 1001a contains an equivalency that indicates the product corresponding to item code 67890 may be found at "/bluesuedeshoes" on the manufacturer's web site. In this case a URL comprising the characters "http:// www.kingshoes.com/bluesuedeshoes" may be formed in step 1002. The query is subsequently hyperlinked to "http://www.kingshoes.com/bluesuedeshoes" according to step 606.

It will thus be seen that according to the present invention a simple yet effective means and apparatus for conveniently accessing product information has been taught. While the invention that has been shown herein is the most practical and preferred embodiment as presently conceived, it will be apparent to those of ordinary skill in the art that many modifications may be made thereof within the scope of the invention, which scope is to be accorded the broadest interpretation of the appended claims so as to encompass all equivalent structures and methods.

We claim:

1. A method of accessing data, comprising:
   reading a radio frequency (RF) tag containing data corresponding to a bar code, wherein the bar code comprises a first portion corresponding to a Uniform Code Council (UCC) company identifier and a second portion corresponding to a UCC item identifier;
   constructing a uniform resource locator (URL) from the data read from the RF tag corresponding to the bar code, wherein a portion of said URL comprises the UCC company identifier and the UCC item identifier;
   calling the URL; and
   displaying information associated with said URL, and wherein said "company identifier" comprises a number assigned by the UCC and said "item identifier" comprises a number assigned by a manufacturer.

2. The method of claim 1 wherein displaying information associated with said URL comprises:
   displaying information of interest about an item associated with the item identifier, wherein the information of interest about the item resides in a user site accessed through the URL.

3. The method of claim 1 wherein the barcode corresponds to a universal product code (UPC) symbol.

4. The method of claim 1 wherein the barcode corresponds to a European Article Numbering (EAN) symbol.

5. The method of claim 1 wherein the barcode corresponds to a Japanese Article Numbering (JAN) symbol.

6. A method of accessing data, comprising:
   receiving bar code information encoding a Uniform Code Council (UCC) company identifier and a UCC item identifier; and
   constructing a uniform resource locator (URL) from the received bar code information, wherein at least a portion of the URL comprises the UCC company identifier and the UCC item identifier constructed as at least a "www" followed by at least the UCC company identifier and the UCC item identifier.

7. The method of claim 6, further comprising:
   scanning a bar code comprising at least a first portion encoding the UCC company identifier and a second portion encoding the UCC item identifier.

8. The method of claim 6, further comprising:
   linking to the URL so that a manufacturer's site is accessed; and
   accessing a portion of the manufacturer's site pertaining to the identified product.

9. The method of claim 8 wherein linking the URL so that a manufacturer's site is accessed comprises:
   attempting to link to a plurality of sites, each site with a different domain name, until at least one of the linked sites responds so that information pertaining to the identified product is received.

10. The method of claim 9, further comprising:
    constructing the ".com" portion of the URL with a domain name, wherein the domain name comprises at least one selected from a group consisting of a ".net" domain name, a ".gov" domain name and a ".org" domain name.

11. The method of claim 8, further comprising:
    receiving at least information pertaining to the identified product from the accessed portion of the site pertaining to the identified product; and
    displaying the information pertaining to the identified product.

12. The method of claim 6 wherein receiving the bar code information comprises:
    receiving the bar code information at a point of sale.

13. The method of claim 6 wherein receiving the bar code information comprises:
    receiving universal product code (UPC) bar code information.

14. The method of claim 6 wherein receiving the bar code information comprises:
    receiving European Article Numbering (EAN) bar code information.

15. The method of claim 6 wherein receiving the bar code information comprises:
    receiving Japanese Article Numbering (JAN) bar code information.

16. The method of claim 7 wherein constructing the URL from the bar code comprises:
    appending the UCC company identifier to "www." to construct the "www.UCC company identifier" portion of the URL; and
    appending the UCC item identifier to "/" to construct the /"UCC item identifier" portion of the URL.

17. The method of claim 6 wherein constructing the URL from the bar code comprises:
    prepending "www." to the UCC company identifier to construct the www."UCC company identifier" portion of the URL; and
    prepending "/" to the UCC item identifier to construct the /"UCC item identifier" portion of the URL.

18. The method of claim 8 wherein linking to the URL comprises:
    calling the URL.

19. A method of accessing data, comprising:
    receiving a uniform resource locator (URL) call to access a manufacturer site that includes information pertaining to an item of interest, wherein the URL of the manufacturer site uses a Uniform Code Council (UCC) company identifier as the domain and uses an item identifier to identify the item of interest; and
    returning the information of interest to a site that initiated the URL call.

20. The method of claim 19 wherein the URL corresponds to a bar code with a UCC company identifier and an item identifier.

21. A method of accessing data, comprising:
    receiving bar code information with at least a Uniform Code Council (UCC) company identifier and an item identifier;
    determining the UCC company identifier from the bar code information; and
    constructing a uniform resource locator (URL) with the UCC company identifier therein.

22. The method of claim 21 wherein the UCC company identifier in the constructed URL is a domain name of a web site.

23. The method of claim 21 wherein the UCC company identifier in the constructed URL identifies a web site of a company associated with the UCC company identifier.

24. The method of claim 21 wherein constructing the URL having the UCC company identifier therein comprises:
constructing the URL to identify a web site; and
constructing the URL such that the UCC company identifier in the constructed URL identifies a location of the web site associated with the company.

25. The method of claim 21, further comprising:
determining the item identifier from the bar code information; and
constructing the URL with the item identifier therein, wherein the item identifier in the constructed URL identifies a location of the web site describing the product associated with the item identifier.

26. The method of claim 25 wherein the item identifier is assigned by the company.

27. The method of claim 26 wherein the item identifier assigned by the company is a UCC item identifier.

* * * * *

UNITED STATES PATENT AND TRADEMARK OFFICE
CERTIFICATE OF CORRECTION

| | | |
|---|---|---|
| PATENT NO. | : 7,921,180 B2 | |
| APPLICATION NO. | : 09/788628 | |
| DATED | : April 5, 2011 | |
| INVENTOR(S) | : Patrick Thomas Greer et al. | |

It is certified that error appears in the above-identified patent and that said Letters Patent is hereby corrected as shown below:

Column 8, Line 28:
"16. The method of claim 7 wherein constructing the URL" should read, --16. The method of claim 6 wherein constructing the URL--.

Signed and Sealed this
Eleventh Day of October, 2011

David J. Kappos
*Director of the United States Patent and Trademark Office*